US005384468A

United States Patent [19]

Milne et al.

[11] Patent Number: 5,384,468

[45] Date of Patent: Jan. 24, 1995

[54] APPARATUS AND METHOD FOR INDICATING THE THICKNESS OF RECORD MEDIA BY FORCING A SPACED ROLLER INTO ENGAGEMENT WITH A PULSE GENERATOR

[75] Inventors: Douglas L. Milne, West Ferry; Ian McIntosh, Monifieth; John Peebles; James Swinton, both of Dundee, all of Scotland

[73] Assignee: NCR Corporation, Dayton, Ohio

[21] Appl. No.: 143,507

[22] Filed: Oct. 4, 1993

[30] Foreign Application Priority Data

Jul. 22, 1993 [GB] United Kingdom ................. 9315145

[51] Int. Cl.[6] ......................... G01N 21/86; G01V 9/04

[52] U.S. Cl. ...................................... 250/560; 271/263

[58] Field of Search ......................... 250/560; 356/381; 271/258, 262, 263

[56] References Cited

U.S. PATENT DOCUMENTS

| | | | |
|---|---|---|---|
| 3,614,419 | 10/1971 | Daughton et al. | 250/223 R |
| 4,066,969 | 1/1978 | Pearce et al. | 328/5 |
| 4,154,437 | 5/1979 | Butcheck et al. | 271/6 |
| 4,160,546 | 7/1979 | McMillan et al. | 271/263 |
| 4,398,711 | 8/1983 | Horst et al. | 271/263 |
| 4,420,151 | 12/1983 | Kobayashi | 271/263 |
| 4,449,399 | 5/1984 | Hain | 73/159 |
| 4,579,334 | 4/1986 | Durajczyk et al. | 271/263 |
| 4,729,556 | 3/1988 | Fujii et al. | 271/263 |
| 4,849,915 | 7/1989 | Worsley et al. | 364/562 |

*Primary Examiner*—David C. Nelms
*Assistant Examiner*—Steven L. Nichols
*Attorney, Agent, or Firm*—Albert L. Sessler, Jr.

[57] ABSTRACT

Apparatus for indicating the thickness of a document being fed along a feed path comprises cooperating upper and lower roll sets (20 and 32) between which a document passes. The lower roll set (20) is driven by the document transport, while the upper roll set (32) is rotatably mounted on a pivotally mounted arm (36), which is urged by a spring (42) to cause the upper roll set (32) to move toward engagement with the lower roll set (20). The upper roll set (32) includes a central cylindrical portion (30) of reduced diameter. A further roll (46) is mounted so that its circumference is normally spaced from the surface of the cylindrical portion by a predetermined distance. A timing disc (52) is mounted for rotation with the further roll (46), and a sensing device (58) is associated with the timing disc (52) to generate pulses as the further roll (46) rotates. If a document of more than a predetermined thickness equal to the predetermined distance passes between the two roll sets (20 and 32) the upper roll set (32) is rocked and engages the further roll (46) to rotate the further roll and the timing disc (52). Pulses are generated, indicating a document in excess of said predetermined thickness. Counting of the pulses by a data processor (68) enables the apparatus to distinguish between a crease in the document and an entire document in excess of said predetermined thickness.

23 Claims, 2 Drawing Sheets

APPARATUS AND METHOD FOR INDICATING THE THICKNESS OF RECORD MEDIA BY FORCING A SPACED ROLLER INTO ENGAGEMENT WITH A PULSE GENERATOR

BACKGROUND OF THE INVENTION

The present invention relates to an apparatus and method for detecting the thickness of record media in a feed path, and more particularly relates to such an apparatus and method in which record media thickness is measured during passage of the record media along a feed path between record medium drive means (which may be formed by drive belts or rolls) and cooperating roll means.

The apparatus which is the subject of the present invention may be employed in a variety of applications in which it is desired to measure the thickness of record media as said media traverse a feed path. One such application is in a document processing module which is employed in automated teller machines (ATMs) widely used by financial institutions such as banks. The module is capable of accepting a document from a bank customer and processing it according to its type. If a single sheet document such as a check or giro form is input by the customer, it is passed to an image processing unit along one feed path. If an envelope (which may contain currency or cheques) is input by the customer, it is passed to a secure bin along another feed path.

The correct feed path is selected by the customer by keying in to the ATM customer keyboard the correct information about the type of document. If, for example, the customer incorrectly inserts an envelope when performing a cheque transaction, the envelope would be passed to the image processing unit. This envelope could be of a greater thickness than that which the image processing unit can handle, and the envelope might therefore become jammed in the feed path, or could damage the image processing unit.

The thickness sensing mechanism is therefore required to insure that documents or other record media of greater than a given thickness are not passed into the image processing unit. The main requirements for such a thickness indicating mechanism are reliability and low cost. Displacement transducers such as an LVDT (linear variable differential transformer) could be used, and would provide a reliable mechanism, but are expensive to implement.

SUMMARY OF THE INVENTION

In the present invention, document or other record media thickness is measured by transforming a displacement between cooperating sets of rolls, between which a document is driven, into a rotary motion which can be detected by an optical sensor, with the duration of such displacement, as the document is driven, being measured by the number of pulses output by said optical sensor. The optical sensor senses indicia on a timing disc that is caused to rotate only when a document having greater than a predetermined thickness is fed between the cooperating sets of rolls.

It is accordingly an object of the present invention to provide a novel apparatus for indicating the thickness of a document or other record media passed along a feed path.

Another object is to provide a novel method for indicating the thickness of a document or other record media passed along a feed path.

Another object is to provide an apparatus for distinguishing between a record medium having greater than a predetermined thickness and a record medium which is creased or otherwise mutilated, and which might provide a short-term indication of thickness greater than a predetermined amount even though the record medium overall is less than the predetermined thickness.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION

Figure 1:
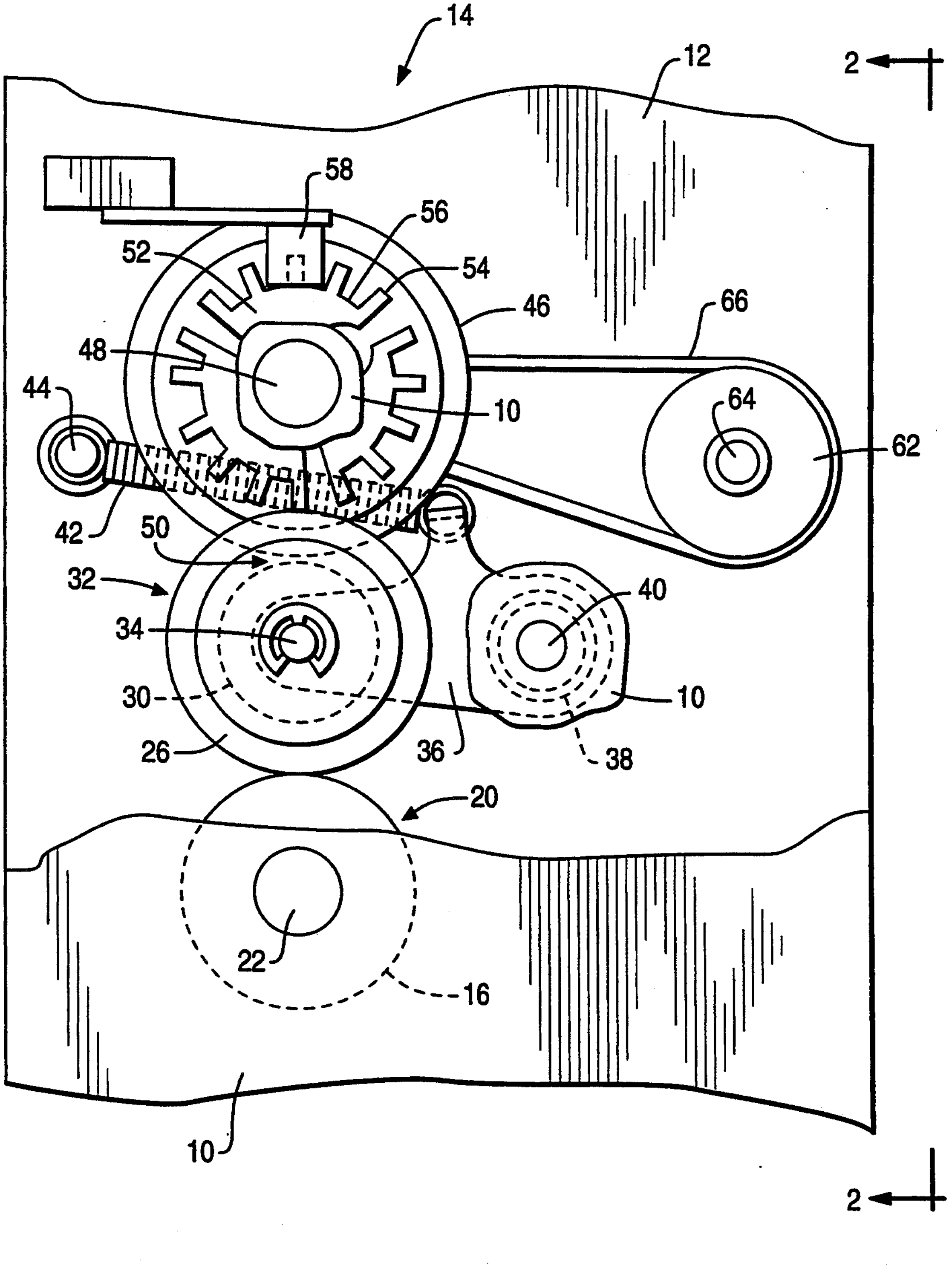
FIG. 1 is a partial elevational view of a document transport, showing two roll sets between which documents or other record media pass, together with an associated mechanism for indicating the thickness of such documents.
Figure 2:
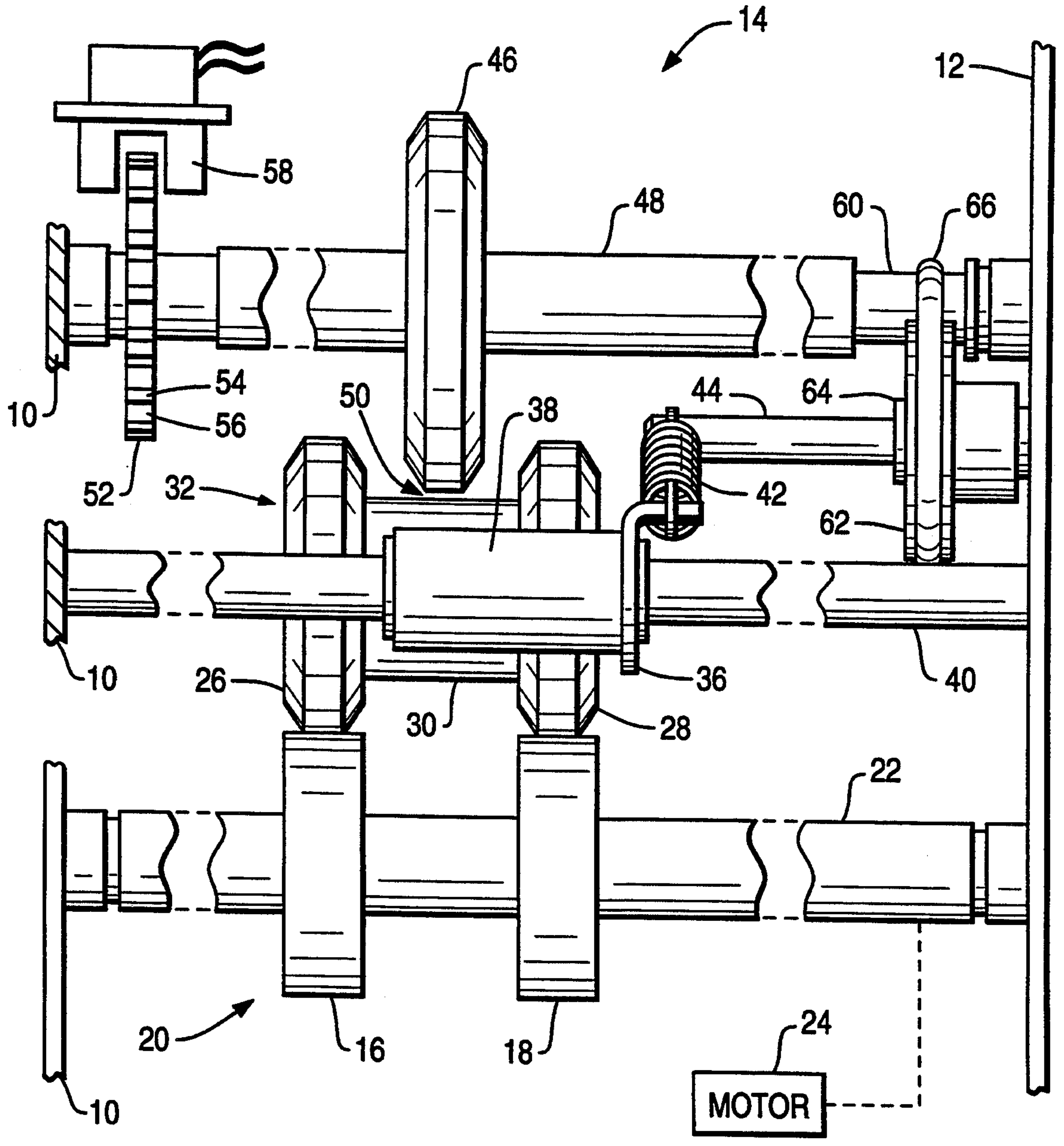
FIG. 2 is an end view of the mechanism of FIG. 1, taken along line 2—2 of FIG. 1.

FIGS. 1 and 2 include a partial showing of frame members 10 and 12 of a document transport indicated generally by the reference character 14. A pair of rubber rolls 16 and 18, comprising a roll set 20, are fixed to a shaft 22, which is journalled in the frame members 10 and 12, and which is driven by a motor 24 included in the transport mechanism. The rolls 16 and 18 are the same size and rotate at the same speed as the other transport rolls (not shown).

Positioned above the rolls 16, 18, as viewed in FIGS. 1 and 2, are a pair of rolls 26 and 28 which are of plastic and which are joined by a cylindrical element 30 of reduced diameter to comprise a further roll set 32. The roll set 32 is not driven by the transport mechanism and is mounted to rotate freely on a shaft 34 at one end of an arm 36, the other end of which is secured to a bearing 38 which in turn rotates freely on a shaft 40 journalled in the frame member 12. The arm 36 is urged to rotate in a counterclockwise direction as viewed in FIG. 1 by a spring 42 which is connected at one end to the arm 36, and is connected at its other end to a shaft 44 fixed in the frame member 12. Thus, normally the rolls 26 and 28 are urged by the spring 42 into engagement with the rolls 16 and 18.

Mounted above the roll set 32 is a single roll 46 which is fixed on a shaft 48 which is journalled to be freely rotatable in the frame members 10 and 12. The shaft 48 is located in the frame members 10 and 12 so that the periphery of roll 46 is slightly spaced from the periphery of the cylindrical element 30 of the roll set 32, when said roll set 32 is in its normal position, as shown in FIGS. 1 and 2, with said space being represented by the reference character 50. This separation is equal to the maximum allowable thickness of a document which may safely pass through the document transport to the image processing unit without possible damage to or jamming of the image processing unit. In the illustrated embodiment of the invention, this space 50 is set equal to one millimeter, although this can be varied for different applications.

The roll 46 is fabricated from a compliant rubber, so that as record media of greater thickness than the space 50 are passed into the nip between the rolls 16, 18 and the rolls 26, 28, the roll 46 will compress slightly, and will therefore not impede the progress of the record media along the feed path.

Also fixed on the shaft 48 to which the roll 46 is fixed is a circular timing disc 52 having a series of evenly spaced projections 54 and spaces 56 positioned along its circumference. If desired, other indicia, such as spaced markings on the disc 52, could be employed in place of the projections and spaces. An optical sensor 58 is positioned in operative relation to the periphery of the disc 52 to sense the projections and spaces as the timing disc 52 rotates.

Figure 3:
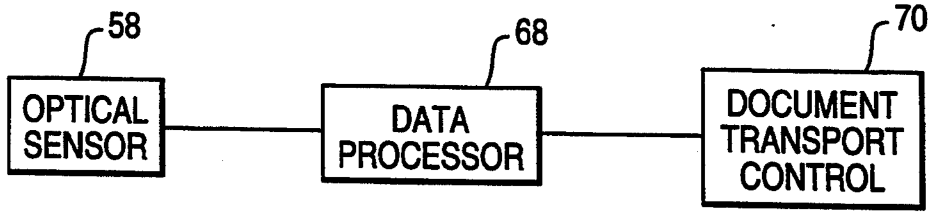
FIG. 3 is a block diagram showing a pulse counting sensor, a data processor and a document transport control.

As shown in the block diagram of FIG. 3, the optical sensor 58 is coupled to a data processor 68 which is arranged to count pulses generated by the sensor 58 in response to rotation of the disc 52. The data processor 68 in turn is coupled to a document transport control 70 for directing the record media being tested in an appropriate feed path.

In order to prevent the roll 46 from rotating freely when it is not being driven by the roll set 32, as will subsequently be described, due to vibration or other causes, roll 46 should have some device associated therewith to provide resistance to rotation. This may comprise a reduced section 60 on the shaft 48 which can act as a pulley to drive a further pulley 62 mounted on a stub shaft 64 by means of a tensioned rubber band drive 66. Such an arrangement provides sufficient resistance, or braking effect, to prevent the roll 46 from rotating freely.

Operation of the apparatus described above is as follows. As a document or other record medium is passed through the document transport 14, it will be driven into the nip between rolls 16, 18 and 26, 28. If the document thickness is less than the space 50, the roll set 32 will not be brought into contact with the roll 46, and therefore the roll 46 will remain stationary, and no pulses will be generated. However if the document is thicker than the space 50, the roll set 32 will be pushed upwardly by the document into contact with the roll 46. Since the roll set 32 is rotating, it will drive roll 46 and cause it to rotate.

As roll 46 rotates, a stream of on-off pulses is generated by the projections and spaces on the timing disc 52 passing through the sensor 58. These pulses provide an indication to the data processor 68 that a document of excessive thickness has been passed into the mechanism. If a customer has selected a cheque/giro type of transaction, suitable action my be taken by the document transport control 70 to prevent the document from being passed into the image processing unit.

If a thin (less than threshold thickness) document is passed into the nip between the rolls 16, 18 and the rolls 26, 28, and said document has previously been folded to cause one or more sharp creases across its surface, this may cause the roll set 32 to be momentarily pushed up into contact with the roll 46, causing it to rotate slightly with each such crease. This may result in some pulses being generated by the electronic circuitry associated with the optical sensor 58. To prevent such pulse generation from being interpreted as indicative of a document of excessive thickness, the pulses can be counted by the data processor 68, so that a signal indicating a document of excessive thickness will be sent to the document transport control 70 only if a certain minimum number of pulses, such as six for example, is detected. The projections and spaces on the timing disc are arranged in such a case that a document of excessive thickness would cause the generation of at least six pulses.

It may be noted that an incidental benefit of the apparatus of the present invention is that the pressure applied to documents by the roll sets 20 and 32 will tend to flatten documents which have a creased or crumpled surface.

Although the invention has been described with particular reference to a preferred embodiment thereof, variations and modifications of the present invention can be effected within the spirit and scope of the following claims.

What is claimed is:

1. Apparatus for indicating the thickness of record media which is passed along a feed path, comprising;

a first roll set;

a second roll set mounted for rotation on an arm pivoted at a point remote from the axis of rotation of said second roll set, said second roll set being positioned to normally engage said first roll set;

means for driving said first roll set;

means urging said second roll set toward engagement with said first roll set;

a third roll rotatable about an axis of rotation positioned so that said third roll is normally spaced a predetermined distance from said second roll set and is thus normally disengaged therefrom;

a pulse generating device coupled to said third roll; and means for counting the pulses generated by said pulse generating device;

whereby when record media is driven between said first and second roll sets by said driving means, if the media is greater in thickness than said predetermined distance, the second roll set rocks on its remote pivot to engage said third roll and to rotate said third roll to cause pulses to be generated by said pulse generating means and counted by said counting means.

2. The apparatus of claim 1, in which the pulse generating device comprises a timing disc rotatable with the third roll and having a plurality of indicia thereon, said pulse generating device also comprising a sensor for sensing the indicia to generate a series of pulses as the timing disc rotates.

3. The apparatus of claim 2, in which the indicia comprise a plurality of projections and spaces arranged around the circumference of the timing disc.

4. The apparatus of claim 2, in which the sensor is an optical sensor.

5. The apparatus of claim 1, in which the first roll set and the second roll set each comprise a pair of rolls, with the rolls of one pair engaging the rolls of the other pair.

6. The apparatus of claim 1, in which the second roll set includes a cylindrical element extending completely between the pair of rolls and having a smaller diameter than the diameter of the rolls.

7. The apparatus of claim 6, in which the third roll is positioned to engage the circumference of said cylindrical element when record media of a thickness greater than said predetermined distance passes between the rolls of said first and second roll sets.

8. The apparatus of claim 6, in which the means for urging said second roll set toward engagement with said first roll set comprises spring means secured to said arm.

9. The apparatus of claim 1, also including means for restraining movement of said third roll except when it is being driven by said second roll set.

10. The apparatus of claim 9, in which said restraining means comprises a pulley and a tensioned drive band coupling said pulley to said third roll.

11. The apparatus of claim 1, in which the first and second roll sets and the third roll are fabricated from a compliant rubber.

12. The apparatus of claim 1, in which the means for counting the pulses generated by the pulse generating device comprises a data processor which employs the pulse count to distinguish between record media of thickness greater than said predetermined distance and a crease in record media of an otherwise acceptable thickness.

13. The apparatus of claim 12, also including a document transport control coupled to said data processor and capable of controlling the feeding of said record media in accordance with the thickness of said record media.

14. The apparatus of claim 1, in which the predetermined distance is approximately one millimeter.

15. The apparatus of claim 1, in which a pulse count of at least six pulses indicates that the record media is of excessive thickness.

16. Apparatus for indicating the thickness of record media which is passed along a feed path in a document transport, comprising:

a first roll set comprising a pair of rolls and a reduced central cylindrical section extending completely between said rolls of said second roll set mounted for rotation on an arm pivoted at a point remote from the axis of rotation of said second roll set, said second roll set being positioned to normally engage said first roll set;

a spring urging said second roll set toward engagement with said first roll set;

a third roll set rotatable about an axis of rotation positioned so that said third roll is normally spaced a predetermined distance from the reduced central section of said second roll set and is thus normally disengaged therefrom;

a timing disc coupled to said third roll for rotation therewith;

an optical sensor positioned in operative relation to said timing disc to generate pulses as said timing disc rotates; and a data processor coupled to said optical sensor for counting the pulses generated by said optical sensor;

whereby when record media is driven between said first and second roll sets, if the media is greater in thickness than said predetermined distance, the second roll set rocks on its remote pivot to cause the reduced central section to engage said third roll and to rotate said third roll to cause pulses to be generated by said optical sensor and to be counted by said data processor.

17. The apparatus of claim 16, also including a pulley and a tensioned drive band coupling the third roll to the pulley to restrain movement of the third roll except when it is being driven by said second roll set.

18. A method for determining whether a record medium which is passed along a feed path has greater than a predetermined thickness, comprising the following steps:

(a) providing a first roll set;

(b) providing a second roll set pivoted at a point remote from its axis of rotation and positioned to engage said first roll set;

(c) providing a third roll normally spaced from the second roll set a distance equal to the predetermined thickness;

(d) providing a pulse generating device coupled to said third roll;

(e) driving said first roll set to cause said record medium to be passed between said first and second roll sets;

(f) causing said second roll set to be moved into engagement with the third roll to drive the third roll whenever the record medium exceeds said predetermined thickness;

(g) generating pulses by said pulse generating device whenever the record medium exceeds said predetermined thickness; and (h) counting the pulses generated to determine whether the record medium is of excessive thickness.

19. The method of claim 18, also including the step of restraining movement of the third roll except when it is being driven by said second roll set.

20. The method of claim 18, in which the step of generating pulses by said pulse generating device comprises sensing spaces and projections on the circumference of a timing disc which rotates with said third roll.

21. The method of claim 18, in which said distance is approximately one millimeter.

22. The method of claim 18, in which a pulse count of more than six pulses indicates that the record medium is of excessive thickness.

23. The method of claim 18, in which the record medium is a financial document.

* * * * *